United States Patent [19]
Johnson

[11] 3,927,779
[45] Dec. 23, 1975

[54] CAR TOP CARRIER FOR BOATS AND THE LIKE

[76] Inventor: Ferris L. Johnson, 14427 Elmport Lane, Poway, Calif. 92064

[22] Filed: July 10, 1974

[21] Appl. No.: 487,301

[52] U.S. Cl. ........... 214/450; 214/85.1; 224/42.1 H
[51] Int. Cl.² ............................................. B60R 9/00
[58] Field of Search ............ 214/450, 505, 85, 85.1, 214/85.5, 75 H, 512; 224/42.1 H

[56] References Cited
UNITED STATES PATENTS

| | | | |
|---|---|---|---|
| 1,464,131 | 8/1923 | Goodger | 214/75 H |
| 2,700,480 | 1/1955 | Triplett | 214/85.5 |
| 3,097,755 | 7/1963 | Fulcher | 214/505 |
| 3,276,610 | 10/1966 | Thatcher | 214/77 R |
| 3,282,455 | 11/1966 | Demarais | 214/450 |
| 3,452,893 | 7/1969 | Heflin | 214/450 |
| 3,708,081 | 1/1973 | Schladenhauffen | 214/450 |

Primary Examiner—Robert G. Sheridan
Assistant Examiner—Ross Weaver
Attorney, Agent, or Firm—George B. White

[57] ABSTRACT

A vehicle top-mounted load carrier, for instance for carrying a boat, includes a pair of guide rails fixedly mounted on the top of the vehicle, and ramp rails corresponding to the guide rails hinged at the rear end of the guide rails so as to incline to the ground, the hinge means being detachable so that the ramp rails can be stored along the guide rails when out of use; a carriage frame movable on rollers on the guide rails and down or up on the ramp rails, and hoisting means on the vehicle to hoist said load carrying carriage frame up or down the ramp rails and along the guide rails; pivoted roller means at the end of the guide rails near the top of the ramp rails engaging the carriage frame so that when the center of gravity of the carriage frame shifts in either direction, it tilts on the upward movement over the guide rails and on the downward movement over the ramp rails; means are provided at the lower end of the ramp rails to limit the downward movement of the carriage frame and means are provided to facilitate the towing of the ramp rails whenever it is necessary to move the vehicle with the ramp rails in lowered position.

2 Claims, 9 Drawing Figures

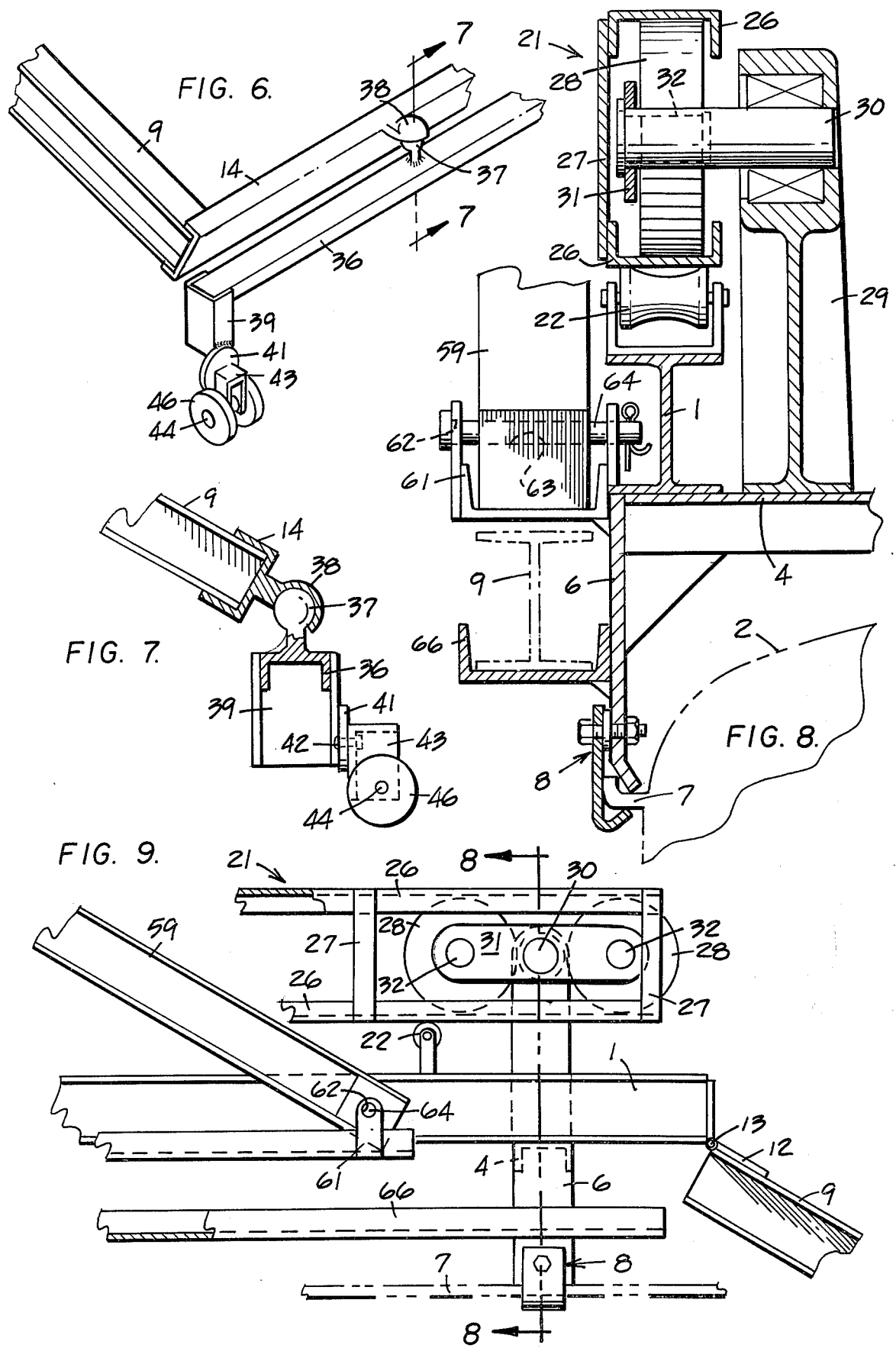

CAR TOP CARRIER FOR BOATS AND THE LIKE

BACKGROUND OF THE INVENTION

The loading of a boat or the like on the top of a vehicle has been a longstanding problem. There were many attempts made to reduce the inconvenience and minimize exertion required to load a boat on the top of a vehicle. For instance, in U.S. Pat. No. 3,679,080 of Fulcher a separate short dolly is provided to facilitate the rolling of the dolly over certain guides from the ground to the top of the vehicle and vice versa, the emphasis being on the short length of the dolly; in U.S. Pat. No. 3,128,893 pivoted arms are lifted from a horizontal to a vertical position in order to raise a frame over the top of the vehicle after the boat is pulled or pushed onto the V tilting frame The primary object of the invention is to provide a load carrying device which eliminates the disadvantages of the prior devices and at the same time minimizes manual exertion previously required in the mounting of a boat or the like on the top of vehicles.

Another object of the invention is to provide a device which can be assembled as a compact unit on the top of a vehicle and which can be quickly adapted for the loading or unloading operation by a power unit, and which operates efficiently and can be manipulated without appreciable exertion by the user.

BRIEF DESCRIPTION OF THE DRAWINGS

FIG. 6 is a fragmental perspective view of a lower corner of the ramp rail and the assembly showing the self-adjustable wheel mounting.

FIG. 7 is a sectional view taken on lines 7—7 of FIG. 6.

FIG. 8 is a sectional view of the rear end of the guide rails on the top of the vehicle and the tiltable roller guides, the section being taken on lines 8—8 of FIG. 9.

FIG. 9 is a fragmental side view of the rear end of the guide rails and the tiltable rollers of the top of the vehicle.

DETAILED DESCRIPTION

Figures 1, 2:
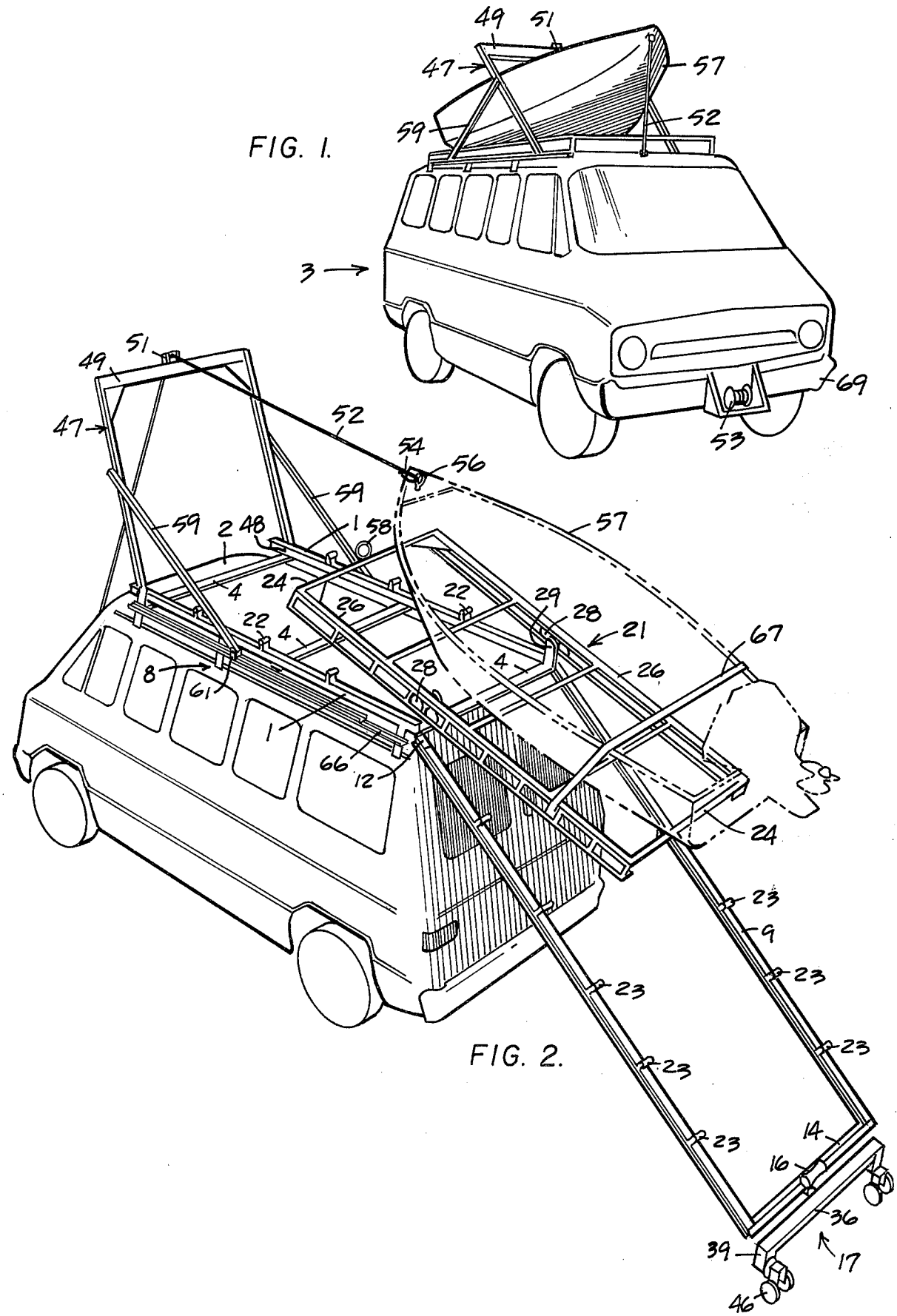
FIG. 1 is a perspective view showing the folded and assembled device with the boat on the top of a vehicle.
FIG. 2 is a perspective view showing the device in operative attitude for unloading or loading.

The carrier herein includes a pair of guide rails 1 which are mounted on the top 2 of a vehicle 3 by any suitable mounting means. In the herein illustrative embodiment plurality of crossbars support the guide rails 1. Each crossbar 4 has a perpendicular flange 6 which extends downwardly along each side of the vehicle top 2 and is secured to a top flange 7 of the vehicle by means of a suitable bolted clamp 8 as shown in FIG. 8.

A pair of ramp rails 9 are pivoted at the upper ends thereof by detachable hinges 12 shown in FIG. 9. By pushing out the hinge pins 13 the ramp rails can be freed for storage on the top of the vehicle as hereinafter described. The lower ends of the ramp rails 9 are connected by a crossbar 14 on which is provided a suitable roller 16 to facilitate the movement of the carrier thereon. The lower crossbar 14 of the ramp rails is provided with suitable wheeled structure 17 to permit the movement of the vehicle when the ramp rails 9 are lowered.

A carriage 21 is movable over rollers 22 on the guide rails 1 and also on rollers 23 on the ramp rails 9. The carriage is formed by a pair of longitudinal frame members connected by crossbars 24 so as to form a rigid frame. Each side of the carriage is constructed, as shown in FIG. 8, by a pair of vertically spaced opposed channels 26 held apart by spacer strips 27. The channels 26 ride on guide rollers 28 located at the rear end of the guide rails 1. A bracket 29 extends from the crossbar 4 at the rear end of the guide rails 1, adjacent to each guide rail 1. A pivot shaft 30 is journalled in the top of each bracket and extends into the space between the adjacent channels 26. A plate 31 is fixed at the end of each pivot shaft 30 inside the space between the channels 26. A stub shaft 32 at each end of the plate 31 supports a guide roller 28 so that as the carriage 21 travels over the guide rollers 28, it tilts in the direction toward which the center of gravity of the carriage and the load thereon is shifted.

The wheeled structure 17 includes a transverse frame 36 which has a male hitch 37 extended from its top into a female hitch socket 38 on the lower crossbar 14. On each end of the transverse frame 36 is a perpendicular bracket 39 which carries a bearing disc 41. On each bearing disc 41 is pivoted on a pivot 42 a bearing block 43 as shown in FIG. 7. On a shaft 44 parallel with the transverse frame 36 and extended through said block 43 are a pair of wheels 46. The ramp rails can be moved over uneven ground because the wheels 46 on the opposite ends of the frame 36 can pivot about a horizontal axis longitudinally with respect to the ramp rails 9, while the transverse frame 36 can adjust itself to uneven ground by the male hitch 37 in the hitch socket 38 lending flexibility in the event the vehicle has to be moved with the ramp rails down.

Figure 3:
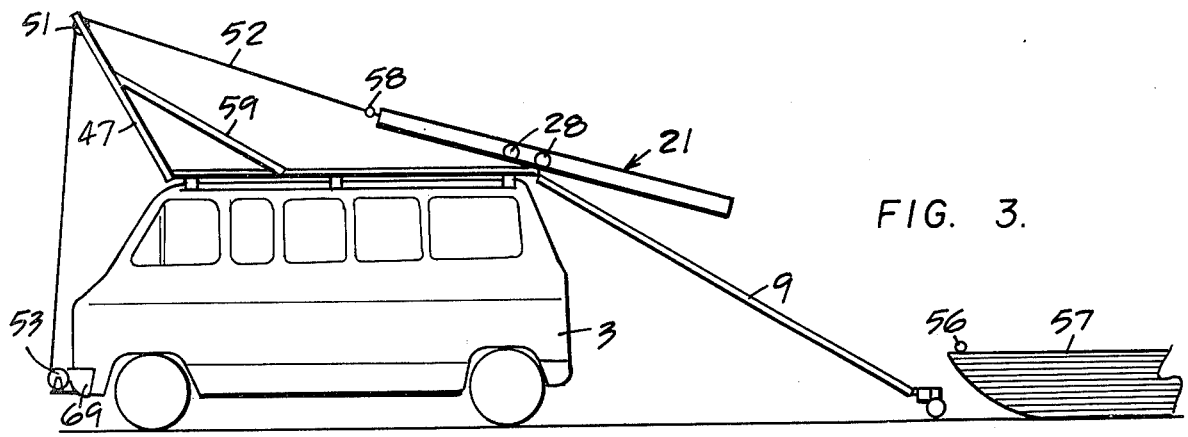
FIG. 3 is a diagramatic view showing the tilting of the carrier frame onto the ramp rails for receiving the boat.
Figure 5:
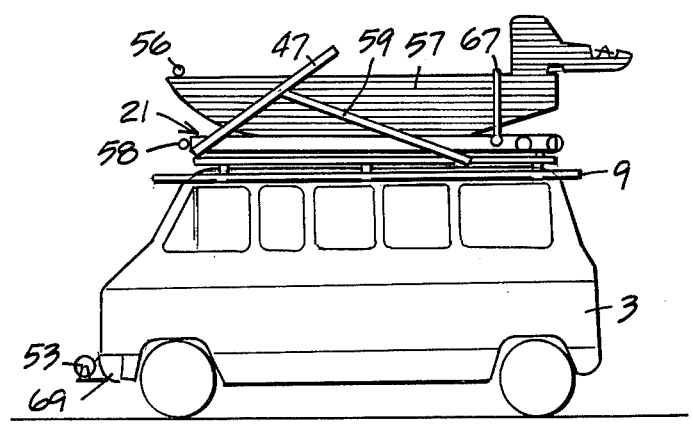
FIG. 5 is a diagramatic view showing the boat on the top of the vehicle and the parts of the device in place thereon.

On the front end of the guide rails is pivoted a winch frame 47 on pivots 48. On a top cross member 49 of frame 47 is a guide roller 51 for a cable 52, which latter is wound in the usual manner on a winch 53. The winch 53 is preferably driven by an electric motor or manually through suitable gearing not shown. The free end of the cable 52 has a hook 54 for engaging a suitable eye 56 on the bow of the boat 57 as shown in FIG. 2. Or the hook 54 may engage an eye 58 on the front crossbar 24 of the carriage 21 as shown in FIG. 3. The winch frame 47 has a pair of pivoted braces 59, each of which extends from a side of the frame 47 toward and along the outside of the adjacent guide rail 1. On the flange 6 of the guide rail is mounted a substantially "U"-shaped socket 61 with suitable bolt holes 62 in its opposite vertical members. The free end of each brace 59 has a hole 63 therethrough to accommodate a pin 64 to hold the brace in the selected socket 61. Accordingly, when the frame 47 is in the operative position as shown in FIG. 2 the respective braces 59 are in a socket 61 nearer to the front end of the guide rails 1 and when the frame 47 is folded over into the position shown in FIG. 5 then the respective braces 59 are fastened in a socket closer to the rear end of the guide rails 1.

Spaced below the socket 61 are U-shaped bar supports 66 so as to leave sufficient clearance above them to accommodate the ramp rails 9 in the position indicated in broken lines in FIG. 8.

Figure 4:
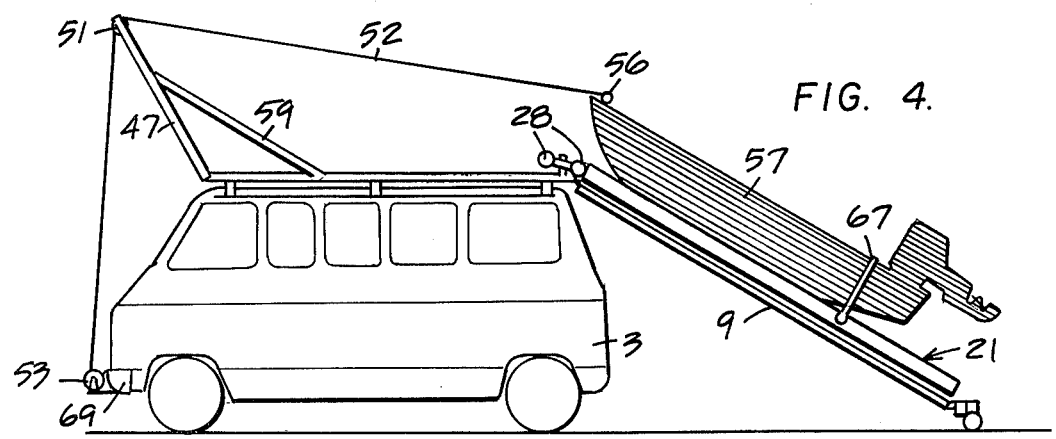
FIG. 4 is a diagramatic view showing the boat on the carrier on the ramp rails.

In operation the ramp rails 9 are pulled off the bracket 66 and the hinge pins 13 are placed into the hinges 12. The winch frame 47 is pulled up into the position shown in FIG. 1 and pins 64 are placed in the holes 62 and 63 to hold the braces 59 in position. The cable 52 is then played over the roller 51 and connected to the adjacent end of the carriage 21 whereupon the winch is turned to slacken the cable 52 as the carriage 21 is pulled until the center of gravity tilts it as shown in FIG. 4 down toward and ultimately onto the ramp rails 9. Then the hook 54 on the end of the cable 52 is hooked to the eye 56 on the load such the bow of a boat 57 and pulls the boat over the carriage 21. The boat is secured by a suitable strap 67 onto the carriage 21. Then the winch 53 is operated to pull the boat 57 and the carriage 21 up to the top of the guide rails 1. Thereafter the ramp rails 1 are freed and pushed onto the bracket 66. The braces 59 are loosened and the winch frame 47 is folded over the boat in the position shown in FIG. 5 and the pins 64 are placed again in position to hold the assembly tight. The electric winch 53 is preferably mounted on the front bumper 69 of the vehicle 3.

I claim:

1. A vehicle top-mounted load carrier comprising,
   guide rails,
   means to mount the guide rails longitudinally on the top of the vehicle,
   ramp rails corresponding to said guide rails,
   detachable means to mount said ramp rails in registry with said guide rails inclined downwardly from the vehicle top,
   a carriage on said guide rails movable along said ramp rails from and to said guide rails and being adapted to carry a load,
   hoisting means on said vehicle to hoist said carriage and said load from and to said guide rails on said ramp rails,
   longitudinal sides of said carriage riding on said rails,
   freely pivotable guide means at the end of said guide rails adjacent to said ramp rails,
   rollers on said pivotable guide means engageable by said longitudinal sides so that said carriage rides over said rollers whereby said carriage tilts toward and onto said guide rails and toward and onto said ramp rails respectively according to when the center of gravity of said carriage and the load thereon is offset toward said guide rails and toward said ramp rails,
   said hoisting means comprising,
   a pivoted winch frame pivotable at the ends of said guide rails farthest from said ramp rails,
   means to hold said pivoted winch frame in elevated position,
   a winch adapted to be secured to the vehicle,
   a cable from said winch extending over said winch frame and adapted to be connected selectively either to the adjacent end of said carriage or the adjacent end of said load for hoisting said load and said carriage,
   said pivoted winch frame being foldable over the load on said carrier on the guide rails,
   and said means to hold said winch frame in position being adjustable from the elevated position of said winch frame to the folded position of said winch frame.

2. The vehicle top-mounted load carrier specified in claim 1, and
   a cross member at the lower end of said ramp rails,
   wheeled means universally mounted on said cross member for permitting travelling of said ramp rails with said vehicle.

* * * * *